United States Patent
Yang et al.

(10) Patent No.: US 8,137,838 B2
(45) Date of Patent: Mar. 20, 2012

(54) BATTERY ELECTRODE PASTE COMPOSITION CONTAINING MODIFIED MALEIMIDES

(75) Inventors: Chang-Rung Yang, Hsinchu (TW); Jing-Pin Pan, Hsinchu (TW); Chien-An Chen, Hsinchu (TW); Jung-Mu Hsu, Hsinchu (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 1181 days.

(21) Appl. No.: 11/976,557

(22) Filed: Oct. 25, 2007

(65) Prior Publication Data
US 2008/0160405 A1    Jul. 3, 2008

(30) Foreign Application Priority Data
Dec. 29, 2006 (TW) ............................. 95149742 A

(51) Int. Cl.
*H01M 4/62* (2006.01)
*H01M 4/13* (2006.01)
(52) U.S. Cl. ..... 429/217; 429/209; 429/212; 429/231.1; 429/231.3; 429/231.8; 429/232; 252/182.1
(58) Field of Classification Search .................. 429/209, 429/212, 215, 217; 252/182.1
See application file for complete search history.

(56) References Cited

U.S. PATENT DOCUMENTS

| | | | | |
|---|---|---|---|---|
| 5,602,213 A | * | 2/1997 | Hsu et al. ................. | 525/454 |
| 6,019,802 A | * | 2/2000 | Ishizuka et al. ............ | 29/623.5 |
| 2004/0062989 A1 | * | 4/2004 | Ueno et al. ................. | 429/217 |
| 2005/0233220 A1 | * | 10/2005 | Gozdz et al. .............. | 429/231.95 |
| 2007/0141461 A1 | * | 6/2007 | Lin et al. ................... | 429/189 |
| 2008/0176141 A1 | * | 7/2008 | Pan et al. ................... | 429/325 |

FOREIGN PATENT DOCUMENTS

| TW | 2004-28430 A | 12/2004 |
|---|---|---|
| TW | 2006-07132 A | 2/2006 |

* cited by examiner

*Primary Examiner* — Barbara Gilliam
*Assistant Examiner* — Robert S Carrico
(74) *Attorney, Agent, or Firm* — Birch, Stewart, Kolasch & Birch, LLP

(57) ABSTRACT

A battery electrode paste composition containing modified maleimide(s) is provided, which has an electrode active material, a conductive additive, a binder and modified maleimide (s) as dispersant. The modified maleimide as the dispersant in the battery electrode paste composition has dendrimer-like hyperbranched structures, which can form a stable complex with the electrode active material. Therefore, owing to the excellent compatibility of the modified maleimide with the solvent in the electrode paste, the storage stability of the paste is increased. Furthermore, through formation of stable bonding between the modified maleimide and the current-collecting metal substrate, the adhesive force between the electrode film and the current-collecting metal substrate is enhanced and the cycling life of the battery product is extended.

19 Claims, 1 Drawing Sheet

■ : positive electrode paste sample 1
□ : positive electrode paste sample 2
▲ : negative electrode paste sample 3
△ : negative electrode paste sample 4

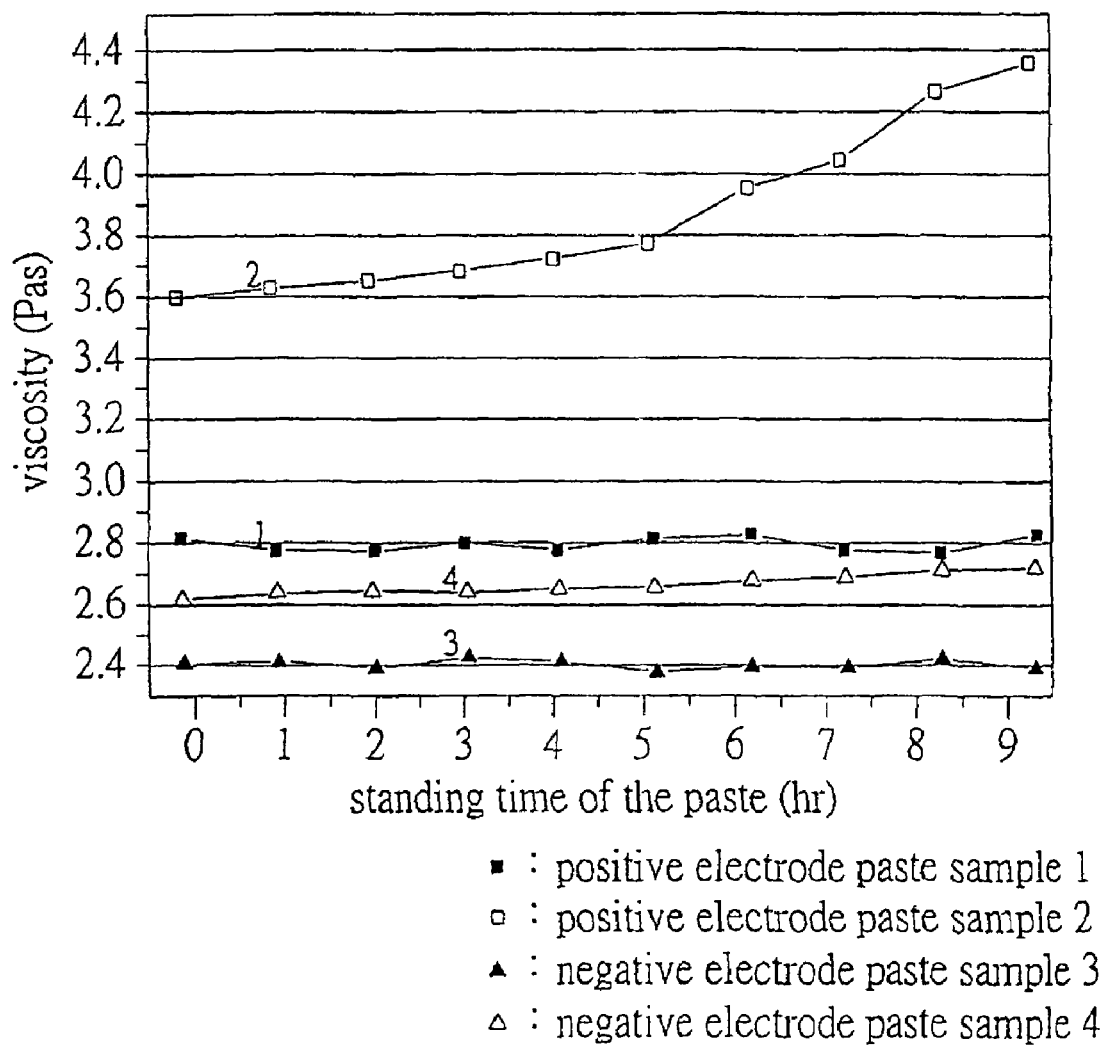

BATTERY ELECTRODE PASTE COMPOSITION CONTAINING MODIFIED MALEIMIDES

FIELD OF THE INVENTION

The present invention is related to battery electrode paste compositions, and more particularly to a electrode paste composition for use in a lithium battery.

BACKGROUND OF THE INVENTION

In recent years, 3C electronic products, such as notebooks, foldable mobile phones, digital cameras, video cameras etc., have a tendency to become smaller, thinner and lighter. This leads to an increased demand for portable energy source, i.e. "secondary battery", especially those with miniaturized sizes and lightweight. Furthermore, with the increased demand for electronic products having multi-functions, high speed, high performance and high power, a secondary battery having high electric capacity is also desired.

In general, the energy density of a lithium ion battery is about 260 to 270 kWh/m$^3$, which is about as twice or more as that of a nickel-cadmium alkaline secondary battery. Lithium ion/lithium polymer secondary batteries have the advantages of rapid charge, high-power discharge, high energy density, long cycling life etc. Accordingly, the lithium ion secondary battery and the lithium polymer secondary battery play important roles in the field of the secondary batteries for small electronic products.

The lithium ion secondary batteries and the lithium polymer secondary batteries are based on the same electrochemical principles as the common batteries. They each comprises a positive electrode, a negative electrode, a separating film and an electrolyte solution as main components. Lithium ions move from the positive electrode to the negative electrode during charge process, while moving from the negative electrode to the positive electrode during discharge process. The positive electrode and the negative electrode each comprises a current-collecting metal substrate, and a surface coating layer (also referred to as "electrode film" hereinafter) comprising an electrode active material, a conductive additive and a binder.

In case that the electrode paste composition is used in preparation of the surface coating layer of a positive electrode, the composition usually contains a metal oxide with high density (such as $LiCoO_2$) as the positive electrode active material and carbon or graphite powder with low density as the conductive additive. When these components with different densities are mixed with the binder such as polyvinyl difluoride (PVDF) and dispersed in the solvent such as N-methylpyrrolidone (NMP), sedimentation may occur, which will result in uneven coating. Thus, the dispersability of the electrode paste composition is considered as one of the main factors affecting the stability of the quality of lithium ion batteries and lithium polymer batteries.

On the other hand, the dispersion uniformity of the electrode active material in the surface of the electrode film, the adhesion of the electrode active material to the electrode film, and the adhesion of the electrode film to the current-collecting metal substrate are all important factors affecting the electrical performance of lithium ion batteries and lithium polymer batteries.

Therefore, it is desired to have an electrode paste composition having high dispersability, low viscosity and high storage stability.

SUMMARY OF THE INVENTION

In view of the above problems, it is the main object of the present invention to provide a battery electrode paste composition having high dispersability.

It is another object of the present invention to provide a battery electrode paste composition having lower viscosity.

It is a further object of the present invention to provide a battery electrode paste composition capable of maintaining stable viscosity for a long time.

It is still a further object of the present invention to provide a battery electrode paste composition having improved stability during storage.

It is a further object of the present invention to provide a battery electrode paste composition capable of producing batteries with extended cycling life.

In order to achieve the above and other objects, the present invention provides a battery electrode paste composition (also abbreviated as "electrode paste composition", or "electrode paste" hereinafter) containing modified maleimide(s), which comprises an electrode active material, a conductive additive, a binder and modified maleimide(s) as dispersant. The modified maleimide as the dispersant in the battery electrode paste composition has dendrimer-like hyperbranched structure, which can form a stable complex with the electrode active material, such as metal oxide and the like. On the other hand, owing to the excellent compatibility of the modified maleimide with the solvent in the electrode paste, the storage stability of the paste is increased. Furthermore, through formation of stable bonding between the modified maleimide and the current-collecting metal substrate, the adhesion between the electrode film and the current-collecting metal substrate is enhanced and the cycling life of the battery product is extended.

DETAILED DESCRIPTION OF THE INVENTION

The battery electrode paste composition containing modified maleimide(s) according to the present invention, comprises an electrode active material, a conductive additive, a binder and modified maleimide(s) as dispersant.

In one embodiment, the modified maleimide in the electrode paste composition is prepared by subjecting barbituric acid or its derivatives of the formula (I):

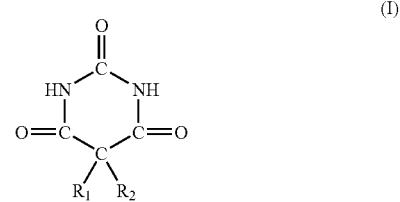

(wherein, $R_1$ and $R_2$ are independently selected from —H, —$CH_3$, —$C_2H_5$, —$C_6H_5$, —$CH(CH_3)_2$, —$CH_2CH(CH_3)_2$, —$CH_2CH_2CH(CH_3)_2$ or —$CH(CH_3)$—$(CH_2)_2$—$CH_3$) and maleimide to a free radical reaction with partial ring opening. The maleimide which is reacted with barbituric acid or its derivatives may be bismaleimide of the formula (II):

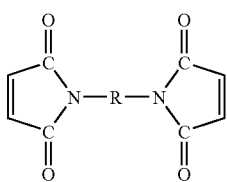

(II)

(wherein, R is —(CH₂)₂—, —(CH₂)₆—, —(C₂)₈—, —(CH₂)₁₂—, —CH₂—C(CH₃)₂—CH₂—CH(CH₃)—(CH₂)₂—, or

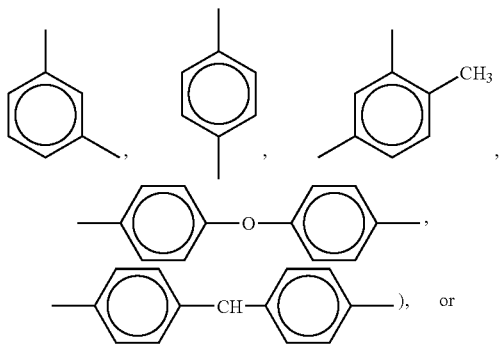

a mixture of bismaleimide and monomaleimide.

The examples of bismaleimides include, but not limited to,
N,N'-ethylene-bismaleimide,
N,N'-butylene-bismaleimide,
N,N'-hexamethylene-bismaleimide,
N,N'-phenylene-bismaleimide, N,N'-4,4'-diphenylmethane-bismaleimide,
N,N'-4,4'-diphenyl ether-bismaleimide, N,N'-4,4'-diphenyl-sulfone-bismaleimide,
N,N'-4,4'-dicyclohexylmethane-bismaleimide,
N,N'-xylene-bismaleimide, and
N,N'-diphenylcylohexane-bismaleimide.

The examples of monomaleimides include, but not limited to, N-phenylmaleimide, N-(o-tolyl)maleimide, N-(m-tolyl)maleimide, N-(p-tolyl)maleimide, N-cyclohexylmaleimide, maleimidophenol, maleimidobenzocyclobutene, phosphorous-containing maleimide, phosphonate-containing maleimide, siloxane-containing maleimide, N-(4-tetrahydroxy-lpyranyloxyphenyl)maleimide and N-(2,6-dimethyl phenyl)-maleimide.

In one embodiment, the modified maleimide is prepared by subjecting the mixture of bismaleimide and monomaleimide in a molar ratio of 100:0~50:50 and barbituric acid or its derivatives to a free radical reaction with partial ring opening. Namely, the modified maleimide can be prepared by reacting bismaleimide alone or a maleimide mixture comprising bismaleimide and monomaleimide, with barbituric acid or its derivatives.

In the above reaction, the molar ratio of the starting maleimide (bismaleimide alone or the mixture of bismaleimide and monomaleimide) to barbituric acid or its derivative is usually in a range of 25:1 to 1:1. The modification reaction is usually carried out in a solvent such as propylene carbonate (PC). The weight ratio of the total weight of the reactants including barbituric acid or its derivative and maleimide(s) to propylene carbonate as solvent is in a range of 3:97 to 40:60. The reaction is usually carried out at a temperature of 110 to 130° C. for 2 to 7 hours.

The electrode paste composition of the present invention contains maleimide, especially bismaleimide, modified with barbituric acid or its derivatives, as dispersant. The modified maleimide has excellent compatibility with the solvent, for example, N-methylpyrrolidone in the electrode paste. In addition, the modified maleimide has dendrimer-like hyper-branched structure and can form a stable complex with the electrode active material such as metal oxide and the like. Therefore, the electrode paste containing the modified maleimide(s) has improved dispersability and decreased viscosity, and can maintain stable viscosity for a long time. As a result, the uniformity of the coating on the electrode plate and operation stability are improved. The content of the modified maleimide(s) in the electrode paste composition of the present invention is typically 0.1 wt % to 5 wt %, preferably 0.2 wt % to 3 wt % based on the total solid content of the electrode paste composition.

The electrode paste composition of the present invention can be used in manufacture of the positive or negative electrode films of lithium ion batteries or lithium polymer batteries. When used in manufacture of the positive electrode film, the electrode paste composition contains a positive electrode active material such as $LiCoO_2$, $LiMnO_2$, $LiNiO_2$, $LiFePO_4$ and the mixture thereof as electrode active material. When used in manufacture of the negative electrode film, the electrode paste composition contains a negative electrode active material such as mesophase carbon micro beads (MCMB), natural graphite powder and the mixture thereof as electrode active material. The content of the electrode active material in the electrode paste composition of the present invention has no limitation if the desired electric capacity can be achieved and the processing properties of the electrode film are not adversely affected. In one embodiment of the present invention, the content of the electrode active material in the electrode paste composition is in a range of 20 wt % to 80 wt %, preferably 40 wt % to 70 wt %, based on the total weight of the composition.

The examples of the conductive additive for use in the electrode paste composition of the present invention include, but not limited to, large graphite particles KS4 (4 µm), large graphite particles KS6 (6 µm), vapor-grown carbon fiber (VGCF) and small carbon black particles (SP). Vapor-grown carbon fiber is preferred. The conductive additive is preferably subjected to a surface treatment to introduce to its surface a functional group capable of reacting with the modified maleimide, for example, those containing double bond. For example, the conductive additive may be modified by a siloxane coupling agent or an oleic acid coupling agent to introduce vinyl groups to its surface. The content of the conductive additive in the electrode paste composition of the present invention is usually in a range of 0.1 wt % to 5 wt %, preferably 0.5 wt % to 5 wt %, based on the total weight of the composition.

The examples of the binder for use in the electrode paste composition of the present invention include, but not limited to, polyvinyl difluoride, acrylic resin and styrene-butadiene rubber (SBR). The binder, when mixed with the modified maleimide, will form a uniform network-like structure, which leads to the improved coating properties of the electrode paste. In addition, when the electrode paste composition of the present invention is used in manufacture of lithium polymer batteries, the compatibility between the electrode paste composition and polymer-type electrolytes will be improved, furthermore, the electric capacity of the batteries will be increased and the cycling life of the batteries will be extended. The content of the binder in the electrode paste composition is typically in a range of 0.1 wt % to 15 wt %, preferably 1 wt % to 10 wt % based on the total weight of the composition.

The electrode paste composition of the present invention may further comprise other additives, for example, a surfactant; a reaction initiator such as peroxides or 2,2'-azobisisobutyronitrile (AIBN).

In view that the electrode paste composition containing modified maleimide(s) according to the present invention has excellent coating properties and can form more even electrode film, a battery produced therefrom will have increased electric capacity and better stability of electric performance, in addition, the production rate and the yield will also be increased. Furthermore, the modified maleimide in the electrode paste composition can form stable bonding with the current-collecting metal substrate; therefore, the adhesive force between the formed electrode film and the current-collecting metal substrate is increased, which leads to extended cycling life of the battery products.

The features and the effects of the present invention are further described by the following specific embodiments, but the present invention is by no means limited to these embodiments.

EXAMPLES

Synthetic Example 1

Preparation of Modified Bismaleimide

N,N'4,4'-diphenylmethane-bismaleimide and barbituric acid were fed to a reactor in a molar ratio of 10:1, then propylene carbonate as solvent was added to said reactor in such an amount that the weight ratio of the reactants to propylene carbonate is 20:80. After mixing, the reaction mixture was heated at a temperature of 130° C. for 3 hours to obtain modified bismaleimide.

Preparation Example 1

Preparation of a Positive Electrode Paste 1820 g of $LiCoO_2$, 120 g of KS 4, 60 g of polyvinyl difluoride (PVDF) and 850 g of N-methylpyrrolidone were fed to a 3D mixer. Then, the modified bismaleimide synthesized in Synthetic Example 1 was fed to the 3D mixer in an amount of 0.4 wt % based on the total solid content of the paste. Finally, quantified standard zirconia beads were added and mixed for 2.5 hours. The zirconia beads were filtered off to obtain the positive electrode paste sample 1.

Preparation Example 2

Preparation of a Positive Electrode Paste (Control)

1820 g of $LiCoO_2$, 120 g of KS 4, 60 g of polyvinyl difluoride (PVDF) and 850 g of N-methylpyrrolidone were fed to a 3D mixer. Then, quantified standard zirconia beads were added and mixed for 2.5 hours. The zirconia beads were filtered off to obtain the positive electrode paste sample 2.

Preparation Example 3

Preparation of a Negative Electrode Paste 930 g of mesophase carbon micro beads (MCMB), 10 g of vapor-grown carbon fiber, 60 g of polyvinyl difluoride (PVDF) and 750 g of N-methylpyrrolidone (NMP) were fed to a 3D mixer. Then, the modified bismaleimide synthesized in Synthetic Example 1 was fed to the 3D mixer in an amount of 0.4 wt % based on the total solid content of the paste. Finally, quantified standard zirconia beads were added and mixed for 2.5 hours. The zirconia beads were filtered off to obtain the negative electrode paste sample 3.

Preparation Example 4

Preparation of a Negative Electrode Paste (Control)

930 g of mesophase carbon micro beads (MCMB), 10 g of vapor-grown carbon fiber, 60 g of polyvinyl difluoride (PVDF) and 750 g of N-methylpyrrolidone (NMP) were fed to a 3D mixer. Then, quantified standard zirconia beads were added and mixed for 2.5 hours. The zirconia beads were filtered off to obtain the negative electrode paste sample 4.

Preparation Example 5

Preparation of a Positive Electrode Plate

The positive electrode pastes obtained in the above Preparation Examples were respectively coated on the upper surfaces of Al foils with a thickness of 15 μm by a coating machine at a rate of 1 m/min to obtain wet paste films with a thickness of 180 μm. The Al foils coated with wet paste films were dried through an oven having two 3 m-long heating zones with the temperature of 100° C. and 130° C., respectively. The paste films had a thickness of 120 μm after drying. Then, the lower surfaces of the aluminum foils were coated with the electrode pastes and dried in the same manner as stated above. The Al foils, with the paste films on their upper and lower surfaces, were pressed by a pressing machine at a compression ratio of 0.7 to obtain positive electrode plates.

Preparation Example 6

Preparation of a Negative Electrode Plate

The negative electrode pastes obtained in the above Preparation Examples were respectively coated on the upper surfaces of rolled annealed copper foils (RA copper foils) with a thickness of 10 μm by a coating machine at a rate of 1 m/min to obtain wet paste films with a thickness of 180 μm. The wet paste films were dried through an oven having two 3 m-long heating zones with the temperature of 100° C. and 130° C., respectively. The paste films had a thickness of 120 μm after drying. Then, the lower surfaces of the RA copper foils were coated with the electrode pastes and dried in the same manner as stated above. The RA copper foils, with the paste films on their upper and lower surfaces, were pressed by a pressing machine at a compression ratio of 0.7 to obtain negative electrode plates.

Test Example 1

Testing the Rheologic Properties of the Pastes

The electrode pastes were allowed to stand and the bottom pastes were taken for testing the rheologic properties such as sedimentation and aggregation every one-hour interval from 0 to 9 hours. The rheologic behaviors of the electrode pastes were tested by an American TA rheometer (ARES-LS1). The rheologic properties of the electrode pastes were evaluated by the inherent viscosity of the pastes when the pastes showed properties like a Newton's fluid.

As shown in FIG. 1, the electrode paste samples containing modified bismaleimide as dispersant, especially the positive electrode paste sample, showed improved dispersability. It is believed that such improved dispersability is owing to that the modified bismaleimide has hyperbranched structure and is capable of forming stable bonding with metal oxide powder with higher specific gravity, for example $LiCoO_2$.

It could also be seen from FIG. 1 that the positive electrode paste sample 1 containing modified maleimide as dispersant (the present invention) had lower viscosity when compared with the positive electrode paste sample 2 containing no modified maleimide (control). In addition, as the standing time increased, the viscosity of the positive electrode paste sample 2 containing no modified maleimide gradually increased, and significantly increased after standing for 5 hours. In the contrast, the positive electrode paste sample 1 containing modified maleimide as dispersant not only had lower initial viscosity, but also maintained such lower viscosity even after standing for 9 hours. It implies that the positive electrode paste according to the present invention could effectively resolve the problems of the previous processes, for example, difficult to produce the positive electrode paste in large scale and difficult to perform coating procedures for a long time.

On the other hand, It could be seen from FIG. 1 that the negative electrode paste sample 3 containing modified bismaleimide as dispersant according to the present invention, when compared with the control negative electrode paste sample 4 containing no modified maleimide, also showed lower viscosity and could maintain such lower viscosity after standing for 9 hours. This indicates that the modified maleimide having hyperbranched structure in the negative electrode paste sample 3 still have viscosity stabilizing effect in spite of absence of metal oxide powder with higher specific gravity (such as $LiCoO_2$).

Example 1

The positive electrode plate was prepared according to the method of Preparation Example 5 by using the positive electrode paste obtained in Preparation Example 1. The negative electrode plate was prepared according to the method of Preparation Example 6 by using the negative electrode paste obtained in Preparation Example 3.

A sample of lithium ion batteries was fabricated by assembling the positive electrode plate, the negative electrode plate and a standard battery core (Jelly Roll) with a size of 30 mm (long)×20 mm (wide)×5 mm (thick), filling 0.9 g of liquid electrolytes for standard lithium batteries and then sealing the obtained assembly. A sample of lithium polymer battery was fabricated by the same method except filled with 0.9 g of polymer-type electrolytes for standard lithium batteries instead of 0.9 g of liquid electrolytes and heated at a temperature of 90° C. for 1 hour after sealing.

Example 2

The positive electrode plate was prepared according to the method of Preparation Example 5 by using the positive electrode paste obtained in Preparation Example 1. The negative electrode plate was prepared according to the method of Preparation Example 6 by using the negative electrode paste obtained in Preparation Example 4.

A sample of lithium ion batteries was fabricated by assembling the positive electrode plate, the negative electrode plate and a standard battery core (Jelly Roll) with a size of 30 mm (long)×20 mm (wide)×5 mm (thick), filling 0.9 g of liquid electrolytes for standard lithium batteries and then sealing the obtained assembly. A sample of lithium polymer batteries was fabricated by the same method except filled with 0.9 g of polymer-type electrolytes for standard lithium batteries instead of 0.9 g of liquid electrolytes and heated at a temperature of 90° C. for 1 hour after sealing.

Example 3

The positive electrode plate was prepared according to the method of Preparation Example 5 by using the positive electrode paste obtained in Preparation Example 2. The negative electrode plate was prepared according to the method of Preparation Example 6 by using the negative electrode paste obtained in Preparation Example 3.

A sample of lithium ion batteries was fabricated by assembling the positive electrode plate, the negative electrode plate and a standard battery core (Jelly Roll) with a size of 30 mm (long)×20 mm (wide)×5 mm (thick), filling 0.9 g of liquid electrolytes for standard lithium batteries and then sealing the obtained assembly. A sample of lithium polymer batteries was fabricated by the same method except filled with 0.9 g of polymer-type electrolytes for standard lithium batteries instead of 0.9 g of liquid electrolytes and heated at a temperature of 90° C. for 1 hour after sealing.

Comparative Example 1

The positive electrode plate was prepared according to the method of Preparation Example 5 by using the positive electrode paste obtained in Preparation Example 2. The negative electrode plate was prepared according to the method of Preparation Example 6 by using the negative electrode paste obtained in Preparation Example 4.

A sample of lithium ion batteries was fabricated by assembling the positive electrode plate, the negative electrode plate and a standard battery core (Jelly Roll) with a size of 30 mm (long)×20 mm (wide)×5 mm (thick), filling 0.9 g of liquid electrolytes for standard lithium batteries and then sealing the obtained assembly. A sample of lithium polymer batteries was fabricated by the same method except filled with 0.9 g of polymer-type electrolytes for standard lithium batteries instead of 0.9 g of liquid electrolytes and heated at a temperature of 90° C. for 1 hour after sealing.

Test Example 2

Measurement of Adhesive Force Between the Electrode Film and Current-Collecting Metal Substrate The adhesive force between the electrode film and current-collecting metal substrate was evaluated by a peel test wherein a tape stuck onto the electrode layer surface was peeled off by a tensile tester at a total pull force of 2 kg in the direction of 180. degree angle for 5 times. The average value of those five measurements was calculated and reported in Table 1.

Test Example 3

Measurement of the Electric Performance of the Batteries

The electric performance was evaluated at a charge and discharge rate of 0.5 C under a constant electric current. The initial discharge capacity and the discharge capacities after 5 cycles and 50 cycles were measured, each for 5 times. The average value of these five measurements was calculated and reported in Table 1.

TABLE 1

| | Performance of battery samples[a] (mAhr) | | | | | | Adhesive force between electrode film and metal substrate | |
|---|---|---|---|---|---|---|---|---|
| | Initial discharge capacity | | Discharge capacity after 5 cycles | | Discharge capacity after 50 cycles | | | |
| | Li | | Li | | Li | | (g/cm) | |
| | Li ion battery | polymer Battery | Li ion battery | polymer Battery | Li ion battery | polymer Battery | Positive electrode | Negative electrode |
| Example 1 | 302 | 288 | 298 | 285 | 291 | 279 | 9.1 | 8.7 |
| Example 2 | 296 | 283 | 290 | 278 | 285 | 271 | 9.1 | 4.6 |
| Example 3 | 291 | 278 | 284 | 271 | 279 | 264 | 4.8 | 8.7 |
| Comparative Example 1 | 285 | 268 | 277 | 256 | 269 | 249 | 4.8 | 4.6 |

[a]The batteries have a size of 30 mm (long) × 20 mm (wide) × 5 mm (thick).

Table 1 showed the performance of the lithium ion battery samples and lithium polymer battery samples obtained in Examples 1 to 3 and Comparative Example 1. Both lithium ion batteries and lithium polymer batteries obtained in Examples 1 to 3 had higher initial discharge capacity and showed less reduction in discharge capacity after 50 charge-discharge cycles, when compared with those obtained in Comparative Example 1.

Table 1 also showed the adhesive force between the electrode film and current-collecting metal substrate in the positive and negative electrodes of the batteries obtained in Examples 1 to 3 and Comparative Example 1.

The positive electrodes of Examples 1 and 2 and the negative electrodes of Example 1 and 3, wherein the electrode films were prepared from the electrode paste composition containing modified bismaleimide, showed higher adhesive force between the electrode film and the current-collecting metal substrate, when compared with the positive and negative electrodes of Comparative Example 1, the positive electrode of Example 3 and the negative electrode of Example 2, wherein the electrode films were prepared from the electrode paste composition containing no modified maleimide.

The above Examples and Comparative Examples are intended to illustrate the principles and the effects of the present invention but not to limit the present invention in any aspects. Persons skilled in the art can make any modification and alteration on these Examples without departing from the spirit and the scope of the present invention. The scope of the present invention is defined by the claims as set forth below.

BRIEF DESCRIPTION OF DRAWINGS

FIG. 1 shows the rheological properties of the positive or negative electrode paste samples of the present invention, which contains modified maleimide, and the control positive or negative electrode paste samples, which contains no modified maleimide.

What is claimed:

1. A battery electrode paste composition containing modified maleimide(s), which comprises:
   (i) an electrode active material;
   (ii) a conductive additive;
   (iii) a binder; and
   (iv) modified maleimide(s) as dispersant,
   wherein the modified maleimide(s) is formed by modifying maleimide(s) with barbituric acid or its derivatives.

2. The battery electrode paste composition according to claim 1, wherein the maleimides include a bismaleimide and a monomaleimide.

3. The battery electrode paste composition according to claim 2, wherein the bismaleimide is selected from the group consisting of N,N'-ethylene-bismaleimde, N,N'-butylene-bismaleimide, N,N'-hexamethylene-bismaleimide, N,N'-phenylene-bismaleimide, N,N'-4,4'-diphenylmethane-bismaleimide, N,N'-4,4'-diphenyl ether-bismaleimide, N,N'-4,4'-diphenylsulfone-bismaleimide, N,N'-4,4'-dicyclohexylmethane-bismaleimide, N,N'-xylene -bismaleimide, and N,N'-diphenylcylohexane-bismaleimide.

4. The battery electrode paste composition according to claim 2, wherein the monomaleimide is selected from the group consisting of
N-phenylmaleimide, N-(o-tolyl)maleimide, N-(m-tolyl) maleimide, N-(p-tolyl)maleimide, N-cyclohexylmaleimide, maleimidophenol, maleimidobenzocyclobutene, phosphorous-containing maleimide, phosphonate-containing maleimide, siloxane-containing maleimide, N-(4-tetrahydroxylpyranyloxyphenyl)maleimide and N-(2,6-dimethyl phenyl)-maleimide.

5. The battery electrode paste composition according to claim 1, wherein the barbituric acid or its derivatives has a structure represented by the following formula:

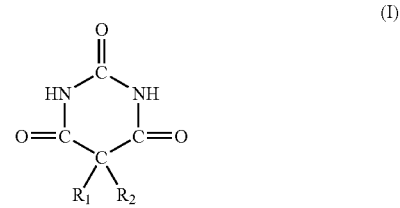

(I)

(in which $R_1$ and $R_2$ are independently selected from —H, —$CH_3$, —$C_2H_5$, —$C_6H_5$, —$CH(CH_3)_2$, —$CH_2CH(CH_3)_2$, —$CH_2CH_2CH(CH_3)_2$ and —$CH(CH_3)$—$(CH_2)_2$—$CH_3$).

6. The battery electrode paste composition according to claim 1, wherein the molar ratio of the maleimide to the barbituric acid or its derivatives is in a range of 25:1 to 1:1.

7. The battery electrode paste composition according to claim 1, wherein the modified maleimide(s) as dispersant is in an amount of 0.1 wt% to 5 wt% based on a total solid content of the composition.

8. The battery electrode paste composition according to claim 1, wherein the electrode active material is a positive electrode active material.

9. The battery electrode paste composition according to claim 8, wherein the positive electrode active material is selected from the group consisting of $LiCoO_2$, $LiMnO_2$, $LiNiO_2$, $LiFePO_4$, and the mixture thereof.

10. The battery electrode paste composition according to claim 1, wherein the electrode active material is a negative electrode active material.

11. The battery electrode paste composition according to claim 10, wherein the negative electrode active material is selected from the group consisting of mesophase carbon micro beads, natural graphite powder and the mixture thereof.

12. The battery electrode paste composition according to claim 1, wherein the electrode active material is in an amount of 20 wt% to 80 wt% based on a total weight of the composition.

13. The battery electrode paste composition according to claim 1, wherein the conductive additive is selected from the group consisting of 4 μm graphite particle 6 μm graphite particle, vapor-grown carbon fiber(VGCF) and carbon black particle (SP).

14. The battery electrode paste composition according to claim 1, wherein the conductive additive is subjected to a surface treatment which is capable of introducing double bond-containing functional groups to a surface of the conductive additive.

15. The battery electrode paste composition according to claim 1, wherein the conductive additive is modified with a coupling agent that is capable of introducing vinyl groups to the conductive additive.

16. The battery electrode paste composition according to claim 15, wherein the coupling agent is selected from the group consisting of a siloxane coupling agent and an oleic acid coupling agent.

17. The battery electrode paste composition according to claim 1, wherein the conductive additive is in an amount of 0.1 wt% to 5 wt% based on a total weight of the composition.

18. The battery electrode paste composition according to claim 1, wherein the binder is selected from the group consisting of polyvinyl difluoride, acrylic acid resin and styrene-butadiene rubber.

19. The battery electrode paste composition according to claim 1, wherein the binder is in an amount of 0.1 wt% to 15 wt% based on a total weight of the composition.

* * * * *